United States Patent

Gilby

[15] 3,639,292
[45] Feb. 1, 1972

[54] INHIBITING THE PRECIPITATION AND/OR DEPOSITION OF FERRIC HYDROXIDE IN AQUEOUS SYSTEMS

[72] Inventor: Patricia G. Gilby, Wilmington, Del.

[73] Assignee: Hercules Incorporated, Wilmington, Del.

[22] Filed: Dec. 22, 1969

[21] Appl. No.: 887,381

[52] U.S. Cl. ...................................252/179, 210/38, 210/58, 252/180, 260/17.3
[51] Int. Cl. ..........................................................C02b 5/06
[58] Field of Search ..................252/179, 175, 180; 260/17.3; 21/2.7; 134/2, 22, 42; 210/24, 38, 58, 59

[56] References Cited

UNITED STATES PATENTS

| | | | |
|---|---|---|---|
| 3,428,568 | 2/1969 | Harker | 252/179 |
| 3,215,654 | 11/1965 | Schmalz | 260/17.3 |
| 3,030,181 | 4/1962 | Milton | 252/179 |
| 3,041,286 | 6/1962 | Goren | 252/179 |

Primary Examiner—John T. Goolkasian
Assistant Examiner—M. E. McCamish
Attorney—Lewis H. Wilson

[57] ABSTRACT

Disclosed is a process for inhibiting the precipitation and/or the deposition of ferric hydroxide on the internal surfaces of the equipment (e.g. heat exchangers and pipes) in aqueous systems, particularly aqueous cooling systems. The process comprises adding certain resin polymers, namely those of U.S. Pat. No. 3,215,654, to the aqueous systems.

11 Claims, No Drawings

INHIBITING THE PRECIPITATION AND/OR DEPOSITION OF FERRIC HYDROXIDE IN AQUEOUS SYSTEMS

The present invention relates to a process of inhibiting the precipitation and/or deposition of ferric hydroxide on the internal surfaces of equipment (e.g., heat exchangers and pipes) of aqueous deposit forming media systems, typical examples of which include aqueous cooling systems, by subjecting the systems to the action of small amounts of certain polymers hereinafter defined.

This deposit results from ferric hydroxide precipitating from the cooling water and depositing on the internal surfaces of the equipment. The deposit greatly reduces the efficiency of the heat exchangers usually causing frequent shutdown of the cooling system for cleaning. Obviously this is quite costly. Although encountering any such difficulties is serious, the degree of the problem varies depending primarily on the source of cooling water, cleanness of the cooling water, and type of cooling system employed. The cooling water comes from various sources including for instance surface water, ground water, and city water (city water being, of course, either surface or ground water which prior to use has been cleaned and chlorine or other biological control agent added). Flowing cooling systems include for instance open evaporative recirculating, closed nonevaporative, and once-through systems. Of these, open evaporative recirculating systems present the greatest problem.

In accordance with the present invention it has been found that subjecting aqueous deposit forming media systems to the action of certain water soluble cationic resin polymers hereinafter defined inhibits the precipitation and/or deposition of ferric hydroxide on the internal surfaces of the equipment of said systems, said polymer being obtained by reacting a polyalkylene polyamine with a dicarboxylic acid selected from the group consisting of diglycolic acid and a $C_3$–$C_{10}$ saturated aliphatic dicarboxylic acid in a mole ratio of about 0.8–1.4 of the former to about 1.0 of the latter to form a water-soluble long chain aminopolyamide, and then reacting said aminopolyamide with epichlorohydrin and an alkylating agent in a mole ratio of epichlorohydrin to amino groups of the aminopolyamide of about 0.5/1–1.8/1 to form an aqueous solution of said polymer. More particularly said polymer is added to the cooling water of said systems and this gives the desired results.

As will be seen from the foregoing disclosure and as the artisan will readily appreciate, the concentration of ferric hydroxide encountered in the cooling water used will vary over a wide range, and even with a given system using a given cooling water this concentration may vary with time.

Several substantial benefits are realized from practicing the present invention. These benefits include e.g., (1) eliminating or greatly reducing shutdowns with attendant increase in production and decrease in cleanout costs, and (2) increasing the cooling efficiency of such systems by providing (a) better heat transfer, (b) higher water flow rates, and (c) lower pressure drops through the system.

Although conventional chelating agents can be used to inhibit the precipitation of ferric hydroxide in the systems disclosed herein, the amounts required to do so are highly impractical. Polymers of the present invention are substantially better inhibitors for this purpose as will be quite evident from the examples given hereinafter.

The following examples illustrate specific embodiments of the present invention. The examples are not intended to limit the present invention to any greater extent than do the appended claims. In the examples and elsewhere herein, unless otherwise specified, percent and parts are by weight, ferric hydroxide concentration is in p.p.m., expressed as ferric ion and based on the water in the system, and polymer concentration (added at one time in each case using a 17.5 percent aqueous solution) is in p.p.m. dry basis on the weight of water in the system. In Examples 15–19 hereinafter ferric hydroxide concentrations were determined by the well-known method of atomic absorption. The polymer used in the examples was made substantially as disclosed and claimed herein, namely using diethylenetriamine as the polyalkylene polyamine, adipic acid as the dicarboxylic acid, epichlorohydrin, and a combination of formic acid and formaldehyde as the alkylating agent.

EXAMPLES 1–14

Laboratory Runs

In these Examples 1–14 a solution containing 100 p.p.m. ferric ion was prepared by dissolving $FeCl_3$ in distilled water. Five-milliliter portions of this solution were added to 200-ml. beakers. Varying amounts of polymer (0.05–0.6 mg.) were added to the beakers and the samples diluted to 90 ml. with distilled water. The pH values of these solutions were adjusted to the values given using dilute NaOH. The concentrations of ferric hydroxide and polymer were adjusted to 5 p.p.m. and 0.5–6.0 p.p.m., respectively, by transferring to stoppered 100-ml. volumetric flasks and diluting to 100 ml. with distilled water buffered to the same pH. Samples were allowed to stand at room temperature (about 25° C.) until precipitation of ferric hydroxide was visually observed. Tests at elevated temperatures were carried out by placing the stoppered flasks in a 60° C. oven.

Further details appear in Tables 1–3 hereinafter.

TABLE 1

Ferric hydroxide conc. 5p.p.m.
Temp. 25° C.—pH 7.0

| Example | Polymer conc. p.p.m. | ½ | 1 | 24 | 96 | hours |
|---|---|---|---|---|---|---|
| 1 | none (control) | – | x | | | |
| 2 | 0.5 | – | – | x | | |
| 3 | 1 | – | – | – | x | |
| 4 | 2, 3, and 5 | – | – | – | – | |

*– = no visible precipitation

*x = significant precipitation

TABLE 2.—VARIOUS pH AT 25° C.

Ferric hydroxide conc. 5 p.p.m.
Temp. 25° C.

| | | Performance | | | | | | | | | | | | | | | |
|---|---|---|---|---|---|---|---|---|---|---|---|---|---|---|---|---|---|
| | | pH 6.0 | | | | pH 7.0 | | | | pH 8.0 | | | | pH 9.0 | | | |
| Example | Polymer conc., p.p.m. | ½ hr. | 1 hr. | 24 hrs. | 96 hrs. | ½ hr. | 1 hr. | 24 hrs. | 96 hrs. | ½ hr. | 1 hr. | 24 hrs. | 96 hrs. | ½ hr. | 1 hr. | 24 hrs. | 96 hrs. |
| 5 | None (control) | – | X | | | – | X | | | – | X | | | – | X | | |
| 6 | 0.5 | – | – | X | | – | – | X | | – | X | | | – | X | | |
| 7 | 1 | – | – | – | X | – | – | – | X | – | X | | | – | X | | |
| 8 | 2 | – | – | – | – | – | – | – | – | – | – | – | – | – | – | – | X |
| 9 | 3, 5 and 6 | – | – | – | – | – | – | – | – | – | – | – | – | – | – | – | – |

—=no visible precipitation; X=significant precipitation.

TABLE 3.—VARIOUS pH AT 60° C.

Ferric hydroxide conc. 5 p.p.m.
Temp. 60° C.

| Example | Polymer conc., p.p.m. | Performance |||||||||||||||
|---|---|---|---|---|---|---|---|---|---|---|---|---|---|---|---|---|
| | | pH 6.0 |||| pH 7.0 |||| pH 8.0 |||| pH 9.0 ||||
| | | ½ hr. | 1 hr. | 24 hrs. | 96 hrs. | ½ hr. | 1 hr. | 24 hrs. | 96 hrs. | ½ hr. | 1 hr. | 24 hrs. | 96 hrs. | ½ hr. | 1 hr. | 24 hrs. | 96 hrs |
| 10 | None (control) | X | | | | X | | | | X | | | | X | | | |
| 11 | 0.5 | — | — | X | | — | — | X | | X | | | | X | | | |
| 12 | 1 | — | — | — | X | — | — | — | X | X | | | | X | | | |
| 13 | 2 | — | — | — | — | — | — | — | — | — | | | | — | — | X | |
| 14 | 3 and 5 | — | — | — | — | — | — | — | — | — | — | — | — | — | — | — | — |

—=no visible precipitation; X=significant precipitation.

EXAMPLES 15 and 16

Plant Runs

In these Examples 15 and 16 influent cooling water at a commercial plant was employed. This water had a ferric hydroxide concentration of 0.77 p.p.m. A sample of this water was taken and 1,000 ml. placed in each of two graduated cylinders. 0.5 p.p.m. (dry basis) polymer was added to one cylinder and nothing was added to the other, and then the ferric hydroxide concentration and pH of each were measured. After standing 24 hours each was measured for ferric hydroxide which has precipitated during the 24-hour period.

Further details appear in Table 4 hereinafter.

TABLE 4

Initial ferric hydroxide conc.     0.77 p.p.m.
Temp. 25° C., pH 8.6

| Example | Polymer conc. p.p.m. | Ferric hydroxide Precipitated, p.p.m. |
|---|---|---|
| 15 | none (control) | 0.47 |
| 16 | 0.5 | 0.27 |

EXAMPLES 17–19

Plant Runs

In these Examples 17–19 the same procedure was employed as in Examples 15 and 16, however the influent cooling water to the commercial plant contained a higher concentration of ferric hydroxide so higher concentrations of polymer were used.

Further details appear in Table 5 hereinafter.

TABLE 5

Initial ferric hydroxide conc.     26.5 p.p.m.
Temp. 25° C., pH 8.6

| Example | Polymer conc. p.p.m. | Ferric hydroxide Precipitated, p.p.m. |
|---|---|---|
| 17 | none (control) | 24.1 |
| 18 | 10 | 20.7 |
| 19 | 25 | 15.1 |

EXAMPLES 20–23

Laboratory Runs

These Examples 20–23 show the substantially better performance of the polymers of the present invention than well-known prior art chelating agents for inhibiting the precipitation of ferric hydroxide. The same procedure was used as in Examples 1–14.

Further details appear in Table 6 hereinafter.

TABLE 6

This Invention Polymers vs. Prior Art Inhibitors

Ferric hydroxide conc. 5 p.p.m.
Temp. 25° C., pH 7.0

| Ex. | Inhibitor Type | Conc. p.p.m. | Performance hours ½ 1 24 96 |
|---|---|---|---|
| 20 | none (control) | | — × |
| 21 | This invention polymer | 2 & 5 | — — — — |
| 22 | Ethylenediaminetetraacetic acid | 2, 5, & 6 | — × |
| 23 | Nitrilotriacetic acid | 2, 5, & 6 | — × |

*—= no visible precipitation

*×= significant precipitation

The expression in the claims hereof "inhibiting the precipitation and/or deposition of ferric hydroxide" is used because of the following. The polymers of the present invention substantially inhibit the precipitation of ferric hydroxide (as demonstrated in the foregoing examples), and that is their most important contribution. However even as to the ferric hydroxide which does precipitate in the presence of these polymers, the precipitate is fluffier than when the polymers are not used and therefore has less tendency to deposit on the internal surfaces of the equipment of the cooling or other system employed and deposits remove easier.

While the foregoing examples illustrate specific embodiments of the present invention, the artisan will readily appreciate that the invention is applicable for the most part considerably outside the scope of these examples.

Although the number of polymers applicable in the present invention are relatively limited, all those within the scope of U.S. Pat. No. 3,215,654 are applicable herein. The polymers preferred for use herein are the same as those set forth as preferred in said patent. Thus preferred polymers applicable in the present invention are those in said patent obtained for example by reacting a polyalkylene polyamine (preferably diethylenetriamine, triethylenetetramine) with a dicarboxylic acid which is either diglycolic acid or a $C_3$–$C_{10}$ (preferably $C_4$–$C_6$) saturated aliphatic dicarboxylic acid (adipic acid being specifically preferred) in a mole ratio of about 0.8–1.4 of the polyalkylene polyamine to about 1 of acid (preferably about 0.9–1.2/1), and then reacting the resulting aminopolyamide with epichlorohydrin and an alkylating agent (preferably either (1) a combination of formic acid and formaldehyde, or (2) dimethyl sulfate) in a mole ratio of epichlorohydrin to amino groups of the aminopolyamide of about 0.5/1–1.8/1 (preferably about 0.9/1–1.5/1), the amount of alkylating agent being such that in excess of about 75 percent of the amino groups initially present in the aminopolyamide are converted to quaternary groups in the polymer product which usually requires about 0.25–1.75 moles of alkylating agent per mole of secondary amine of the aminopolyamide. In one procedure the aminopolyamide can first be reacted with the alkylating agent and the resulting product then reacted with epichlorohydrin. In an alternative procedure the aminopolyamide can first be reacted with epichlorohydrin and the resulting product then reacted with the alkylating agent. Polymers prepared by either procedure are applicable in the present invention.

The molecular weight of the polymers applicable herein varies considerably. Generally they will fall within a molecular weight range of about 5,000–1,000,000 or higher, but more usually within a range of about 10,000–100,000. Preferably the polymers will have a minimum molecular weight of not less than about 10,000.

As is well understood in this art, the amount of polymer applicable in the present invention varies widely. Generally the amount will be about 0.1–100 parts by weight of polymer per million parts by weight of the water in the system. It is preferred to use about 1–50 p.p.m. polymer, about 1–10 p.p.m. being specifically preferred in several cases. However amounts outside these ranges can be used.

The particular manner in which the polymer is added to the water in the system is not critical. The polymer for example may be added periodically (intermittently) or continuously, however continuous addition gives considerably better results in most cases. Periodic addition may be substantially instantaneous or extended over a relatively short period of time. Of course in periodic addition the polymer concentration should not be permitted to fall below the minimum required under the circumstances. The polymers as conventionally prepared are in the form of aqueous solutions and should be used as such in the present invention. Although about 17.5 percent aqueous solutions of polymer were used in the foregoing examples, the particular concentration is not critical.

The present invention is applicable to inhibiting the precipitation and/or deposition of ferric hydroxide on the surfaces of equipment of aqueous deposit forming media systems in general. These systems include all systems wherein water containing suspended solids flows through pipes or other equipment or components of the system. More particularly these systems include for example all water-cooled systems which in turn comprise for example open evaporative recirculating systems, closed nonevaporating systems, and once-through systems. As pointed out hereinbefore, the greatest need for the present invention is in open evaporative recirculating water-cooled systems.

Although not critical or even per se a part of the present invention, there are conditions in categories outside those disclosed hereinbefore which the artisan would usually employ as a matter of good or preferred practice in operating the systems in which the present invention are applicable, and operating within these conditions gives the maximum benefits from this invention. These include for instance employing suitable biological and corrosion control programs, cooling water temperatures of above freezing to about 140° F., a pH of about 4–9 (preferably below about 7), and a suitable water flow rate through the system.

As many apparent and widely different embodiments of this invention may be made without departing from the spirit and scope thereof, it is to be understood that the invention is not limited to the specific embodiment thereof except as defined in the appended claims.

What I claim and desire to protect by Letters Patent is:

1. A process of inhibiting the precipitation of ferric hydroxide and thereby inhibiting its deposition on the surfaces of equipment of aqueous deposit forming media systems which comprises subjecting said systems to the action of a water soluble cationic resin polymer obtained by reacting a polyalkylene polyamine with a dicarboxylic acid selected from the group consisting of diglycolic acid and a $C_3$–$C_{10}$ saturated aliphatic dicarboxylic acid in a mole ratio of about 0.8–1.4 of the former to about 1.0 of the latter to form a water soluble long chain aminopolyamide, and then reacting said aminopolyamide with epichlorohydrin and an alkylating agent in a mole ratio of epichlorohydrin to amino groups of the aminopolyamide of about 0.5/1–1.8/1 to form an aqueous solution of said polymer.

2. Process of claim 1 wherein the mole ratio of alkylating agent to amino groups of the aminopolyamide is sufficient to convert in excess of 75 percent of the amino groups initially present in the aminopolyamide to quaternary groups in said polymer.

3. Process of claim 1 wherein the polyalkylene polyamine is diethylenetriamine.

4. Process of claim 1 wherein the polyalkylene polyamine is triethylenetetramine.

5. Process of claim 1 wherein the polyalkylene polyamine is tetraethylenepentamine.

6. Process of claim 1 wherein said dicarboxylic acid is a $C_4$–$C_6$ saturated aliphatic dicarboxylic acid.

7. Process of claim 6 wherein said dicarboxylic acid is adipic acid.

8. Process of claim 1 wherein said dicarboxylic acid is diglycolic acid.

9. Process of claim 1 wherein the alkylating agent is a methylating agent.

10. Process of claim 9 wherein the methylating agent is dimethyl sulfate.

11. Process of claim 1 wherein the polyalkylene polyamine is diethylenetriamine, said dicarboxylic acid is adipic acid, and the alkylating agent is a combination of formic acid and formaldehyde.

* * * * *